Figure 1:
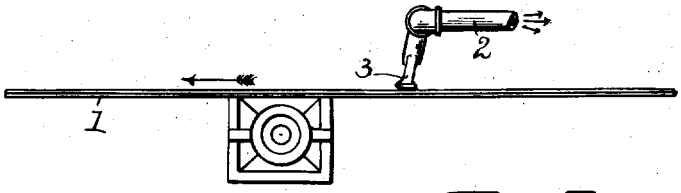

P. WESTON.

METHOD OF MAKING PAPER.

APPLICATION FILED JAN. 31, 1914.

Reissued May 12, 1914.

13,730.

2 SHEETS—SHEET 1.

Witnesses

Albert Popkins

Grace P. Brereton

Inventor

Philip Weston

By Shurtleff & Mason

Attorneys

P. WESTON.

METHOD OF MAKING PAPER.

APPLICATION FILED JAN. 31, 1914.

Reissued May 12, 1914.

13,730.

2 SHEETS—SHEET 2.

Inventor

Philip Weston

Witnesses

Albert Popkins

Grace P. Brereton

By Shinkle and Mason

Attorneys.

UNITED STATES PATENT OFFICE.

PHILIP WESTON, OF DALTON, MASSACHUSETTS.

METHOD OF MAKING PAPER.

13,730. Specification of Reissued Letters Patent. Reissued May 12, 1914.

Original No. 1,008,228, dated November 7, 1911, Serial No. 640,716. Application for reissue filed January 31, 1914. Serial No. 815,853.

*To all whom it may concern:*

Be it known that I, PHILIP WESTON, a citizen of the United States, residing at Dalton, in the county of Berkshire, State of Massachusetts, have invented certain new and useful Improvements in Methods of Making Paper, of which the following is a description, reference being had to the accompanying drawings and to the letters and figures of reference marked thereon.

It is desirable in books employing relatively thick writing paper, such, for instance, as ledgers, and whether said books have permanent leaves or detachable ones, that the leaf be made thinner adjacent its binding line or end, in order that it may be more readily and easily turned in the opening of the book, may lie more flatly when open, and may take less space or thickness at the bend; and the present invention consists in a method of decreasing the thickness of a web of paper during its manufacture, from the pulp, and in the paper-making machine, whereby the web may have produced in it during such manufacture one or more sections, which shall be thinner than the main parts of the web, and which thin sections shall be so arranged in the web as to permit the web to be subsequently cut into leaves, which shall have such end sections adjacent to the binding edges or portions thereof.

The present invention has been designed particularly for use in the manufacture of paper to be made up into so called "loose leaf ledger" sheets, although it will be understood that it may not be so restricted. Therefore, the particular finished article which I illustrate herein is a loose leaf ledger sheet, having the marginal edge and body portion joined by a thin portion, so that the leaf will lie flat in the book.

Before fully describing my invention, it may be desirable to make brief mention of the prior art on this general subject.

The operation of making "deckle-edged" paper is old and well known, and need not be further referred to. It is also old to score or make a narrow groove in paper by the use of a specially constructed "dandy roll." So far, however, as methods of manufacturing paper to be made up into independent sheets with the thin edges, for binding, are concerned, the only method in use so far as I am aware, is that of skiving or grinding down a portion of the sheet in its finished state. It has also been proposed, (but so far as I am aware, the method is not in use,) to place in juxtaposition to the Fourdrinier or other paper machine, a roll or series of rolls which displace and compress the portions of the material brought into contact therewith, thus producing a channel or a series of channels in the web, the bottoms of which are thinner than the adjoining portions. Moisture is then extracted from the thin portions, preferably by suction, and the thicker portions are treated and finished in the usual manner. In other words, that method may be said to consist in subjecting the pulpy mass to the action of rotary members by which certain portions are displaced and compressed, and removing more of the moisture in proportion from the displaced and compressed portions than from the portions adjoining. A modification of this latter method has also been proposed, viz., the heating of the compressing rolls for the purpose of removing the moisture. While, as I have heretofore said, these methods have been proposed and patents granted thereon, so far as I am aware, they have not been put into use.

A well defined channel caused by compression of the material, is objectionable, in that it leaves a shoulder where the channeled portion is joined onto the body or higher portion, and, furthermore, as the pulp in the channel is compressed only and not removed, it does not leave the thin portion as flexible as is desirable.

My invention consists broadly in a method of producing paper of the character mentioned by treating the web while in a pulpy state on the Fourdrinier or cylinder, with air pressure, either suction or blast, whereby in the former a portion of the web in a defined line is sucked away, and in the latter a portion is blown away, or over onto the adjacent portions of the web, thus removing a portion of the web and leaving a thinned strip or strips.

In a more restricted sense, the invention consists in the removal of a portion of the thickness of the web, along certain defined lines by suction applied to such lines of the web, and finally, in the matters hereinafter described and referred to in the appended claims.

The invention is illustrated in the accompanying drawings, which are more or less diagrammatic, and in which—

Figure 2:
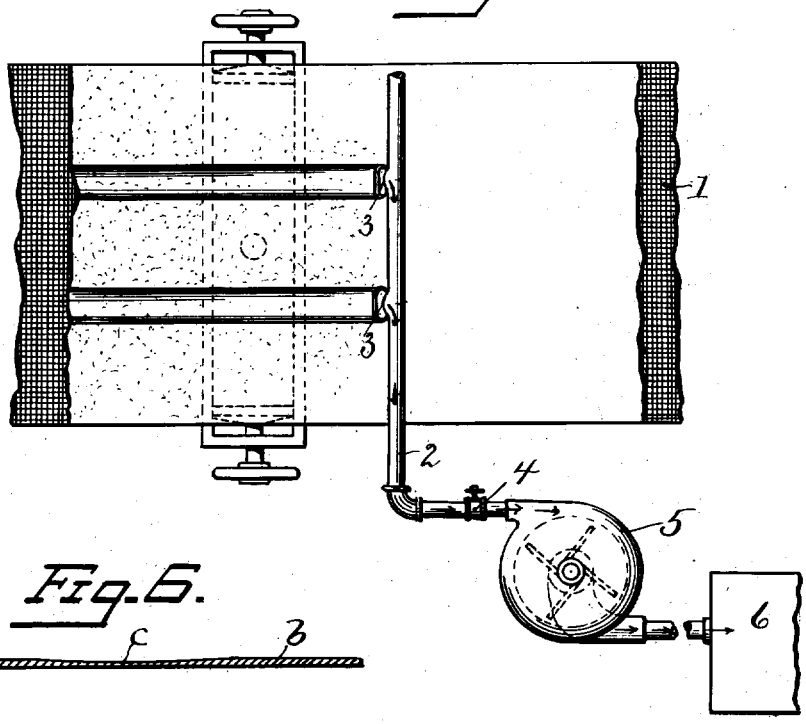
Figure 6:
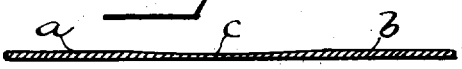
Figure 3:
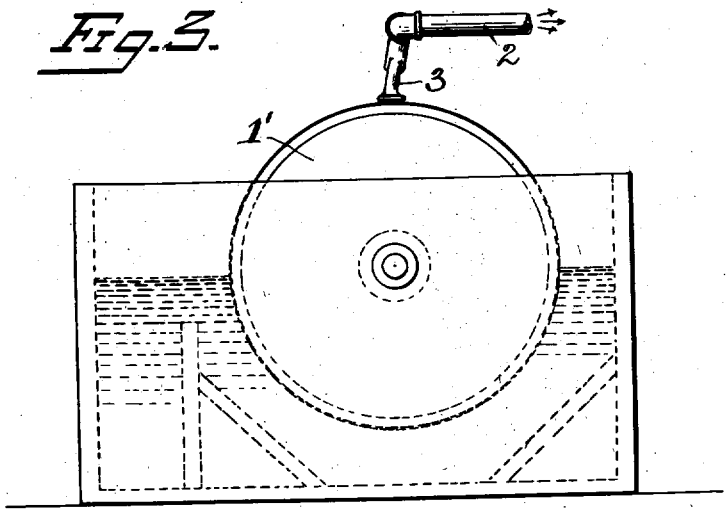
Figure 4:
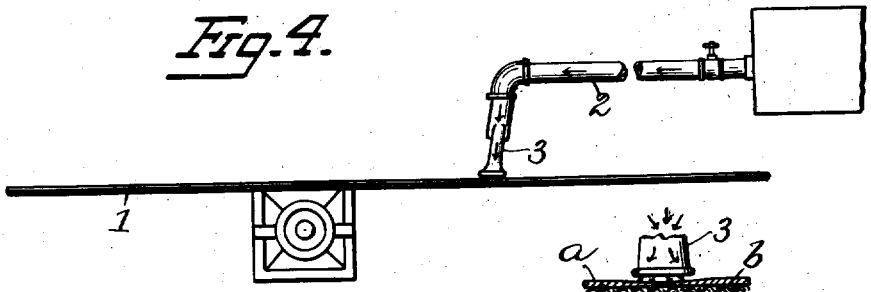
Figure 4A:
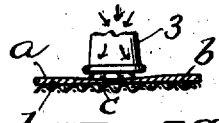
Figure 5:
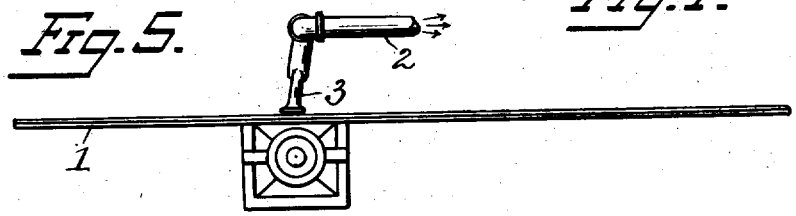

Figure 1 is a side view of a mechanism adapted for the carrying out of my method on a Fourdrinier machine; Fig. 2 is a plan view of the same; Fig. 3 is a view similar to Fig. 1, showing the method as applied to a cylinder machine; Fig. 4 is a view similar to Fig. 2, showing the use of an air blast instead of suction; Fig. 4ª is a detailed section of Fig. 4; Fig. 5 is a view similar to Fig. 1, in which the suction nozzles are arranged over the first suction box; and Fig. 6 is a view of a loose leaf ledger sheet made in accordance with my invention.

Before referring specifically to the drawings, it may be stated that the paper material while in a plastic condition on the moving wire of an ordinary Fourdrinier paper-making machine, or while on the cylinder of an ordinary cylinder machine, is passed beneath the end or ends of a tube or tubes or a nozzle or nozzles, which, under the sucking action of a centrifugal pump or similar apparatus, suck away or remove a portion of the material in operative juxtaposition to the tube or nozzle, leaving that portion of the web thinner than the body part outside the sphere of action of the suction nozzles. The web is then fed over a suction box and treated in the usual manner, and if desired the web may be passed over a suction box before coming under the influence of the suction nozzles.

Instead of suction nozzles or tubes being used, air pressure or air blast nozzles may be used, in which event a portion of the web adjacent thereto would be blown away to one side or the other, leaving the above mentioned thin portion.

It will be understood that the nozzles may be arranged as shown in Fig. 1, that is, ahead of the first suction box; but it will also be understood that they may be arranged in a plane between the first and second suction boxes, or as shown in Fig. 5, may be arranged over the first suction box, in which event the suction of the nozzles would have to be regulated to accord with the suction of the box, the latter acting to draw out the water and draw the pulp against the wire, while the former acts to remove some of the pulp.

Mechanism for carrying out the method as shown in Figs. 1 and 2 consists of the Fourdrinier wire 1, arranged to travel in the direction indicated by the arrows. A suction pipe 2, with the nozzles 3, leads to a point in operative proximity to the surface of the web, so that when the suction is properly regulated by the valves 4, a portion of the web will be removed by the action of the centrifugal pump 5, in connection with the pipe 2, drawn through the pump and discharged into the stuff chest 6.

In Fig. 3, the mechanism used in carrying out the method on a cylinder paper-making machine is illustrated, a cylinder 1′ being used instead of the Fourdrinier wire shown in the other figures.

Fig. 4 illustrates a modification of my method for removing a portion of the web by the use of air, but instead of air suction being used, air pressure is utilized. Air is forced through the nozzles 3 onto the web, and a portion of the web surface in proximity thereto is blown to one side or the other, thus leaving the thinned portion of the web, the latter being thereafter operated upon in the usual way.

In Fig. 6 is illustrated a form of leaf made according to my method, in which the body and marginal binding edge *a* and *b* respectively are of the same thickness, the thinned portion *c* being formed by the removal of material, according to my method.

I do not wish to be limited to the exact manner shown, of applying the suction or the air blast, as changes may be made without departing from the spirit of my invention.

Having thus described my invention, what I claim as new and desire to secure by Letters Patent, is:—

1. The method of manufacturing paper having a thin portion, which consists in reducing the thickness of the web by removal of a portion of the material along a continuous defined line as it passes over the first suction box.

2. The method herein described, of manufacturing paper having a thinned portion, which consists in removing from the web at the portion to be thinned along a defined line, some of the material by the application of air pressure thereto.

3. The method herein described, of manufacturing paper having a thinned portion, which consists in removing from the web at the portion to be thinned, some of the material by the application of suction thereto.

4. The method of manufacturing paper having a thinned portion which consists in reducing the thickness of the web along a continuous defined line as it passes over the first suction box, by applying suction to the web above said first suction box.

5. The method of manufacturing paper having a thinned portion, which consists in reducing the thickness of the web along a continuous defined line as it passes over the first suction box, by applying suction to the web above said first suction box, and regulating the relative air suction above and below the web.

PHILIP WESTON.

Witnesses:
CHARLES L. STURTEVANT,
EUGENE G. MASON.